Figure 1A:
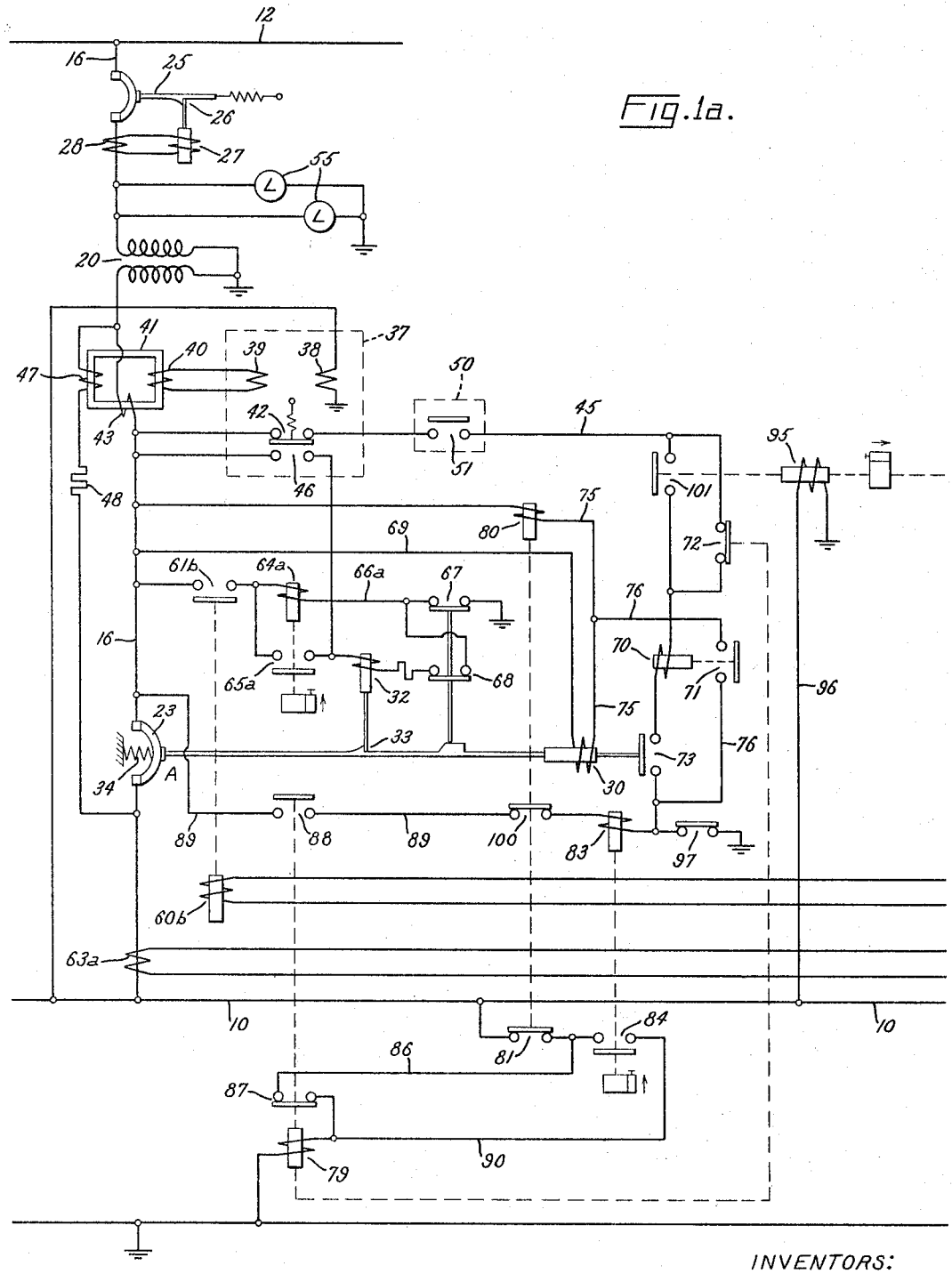

3,383,562
ELECTRICAL DISTRIBUTION SYSTEM
Jackson F. Fuller, Denver, Colo., and Harold H. Lawson, Philadelphia, Pa., assignors to General Electric Company, a corporation of New York
Filed May 16, 1966, Ser. No. 550,368
5 Claims. (Cl. 317—22)

This invention relates to a system of electrical distribution and particularly to such a system in which a network is supplied with current at a plurality of points by means of feeder circuits, each of which includes a step-down transformer and an associated network protector. Each network protector comprises a network circuit breaker interposed between the transformer and the network and control apparatus for the network circuit breaker.

The usual control apparatus for a network circuit breaker comprises a master relay in the form of a power directional relay for effecting opening of the network circuit breaker in response to reverse power, i.e., the flow of power from the network into the feeder. After an opening operation, the master relay allows the network circuit breaker to reclose only when the transformer secondary voltage exceeds that of the network. A second conventional relay, called a phasing relay, allows reclosing to occur only when the transformer voltage leads the network voltage. The combined effect of the master and phasing relays is to allow reclosing of the network circuit breaker only when voltage conditions are such that power will flow from the feeder into the network upon reclosing. By allowing reclosing to occur only under these conditions, assurance is had that the network circuit breaker will not immediately reopen in response to reverse wattmetric power flow, thus reducing the likelihood of repeated opening and closing operations, or "pumping," of the network circuit breaker.

In certain applications, it is necessary to utilize feeders that originate from different substations and have loads other than the network connected to them at various points on the feeders. This presents a problem inasmuch as possible voltage and phase angle differences can give rise to circulating currents which can cause overheating of portions of the system and may result in the above-described "pumping." In this respect, assume a network with first and second feeders of this type connected to it through first and second network circuit breakers, respectively. Assume a reactive circulating current flowing from the network through the second network circuit breaker into the second feeder. This reactive circulating current, in flowing from the network into the second feeder through the second network circuit breaker, will not cause the master relay of the second network circuit breaker to effect tripping of the second circuit breaker inasmuch as the circulating current is reactive and does not result in wattmetric power flowing through this second network circuit breaker out of the network, only reactive power or vars. But this reactive circulating current does result in wattmetric power flowing through the first network circuit breaker into the network. The master relay of this first network circuit breaker will not, however, trip the first network circuit breaker in response to such power flow since it is in the proper direction. Yet the combined effect of the circulating current and the normal current flowing into the network through the first feeder may be to overheat the transformer associated with the first network circuit breaker.

An object of the present invention is to protect the transformers of such a system against overheating resulting from such circulating currents.

Another object is to provide such protection without causing an excessive amount of pumping.

In carrying out our invention in one form, we provide a distribution system that comprises a network, a pair of feeders for respectively supplying power to the network, and loads other than the network respectively connected to the feeders for receiving power supplied thereto through the feeders. First and second network circuit breakers are utilized for connecting the respective feeders to the network. Control apparatus is associated with each network circuit breaker for causing opening of the associated network breaker when the direction of power flow is from the network into the associated feeder. For protecting against the above-described reactive circulating current condition which can arise in such a system, we provide means responsive to overcurrent flowing through the first network breaker into the network for causing the second network breaker to open in response to said overcurrent exceeding a predetermined value.

Figure 1B:
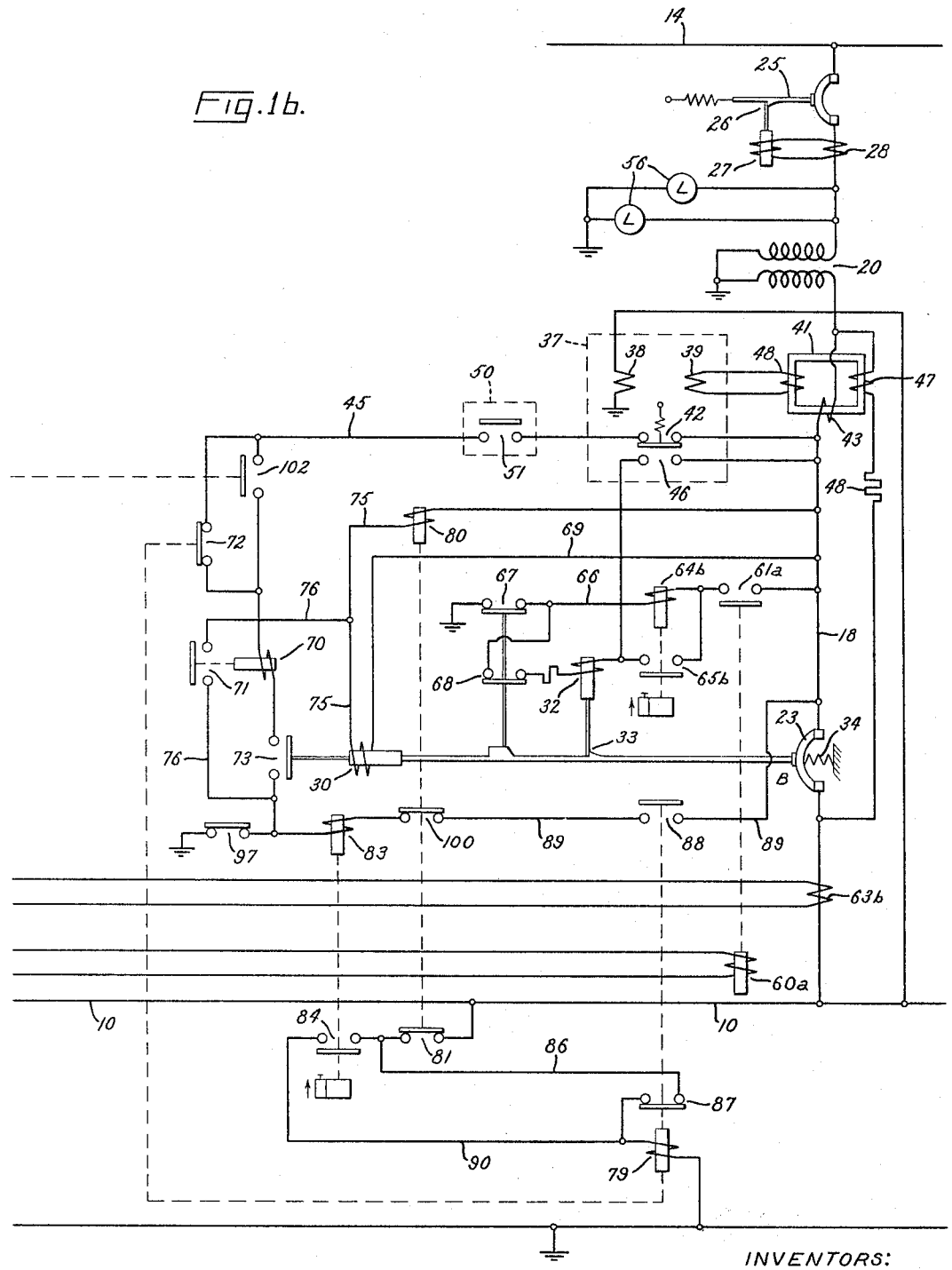

For a better understanding of the invention, reference may be had to the following description taken in connection with the accompanying drawing, wherein:

FIG. 1 consists of two parts FIG. 1a and FIG. 1b. FIGS. 1a and 1b, when taken together and aligned, schematically illustrate a distribution system embodying one form of the present invention.

Figure 2:
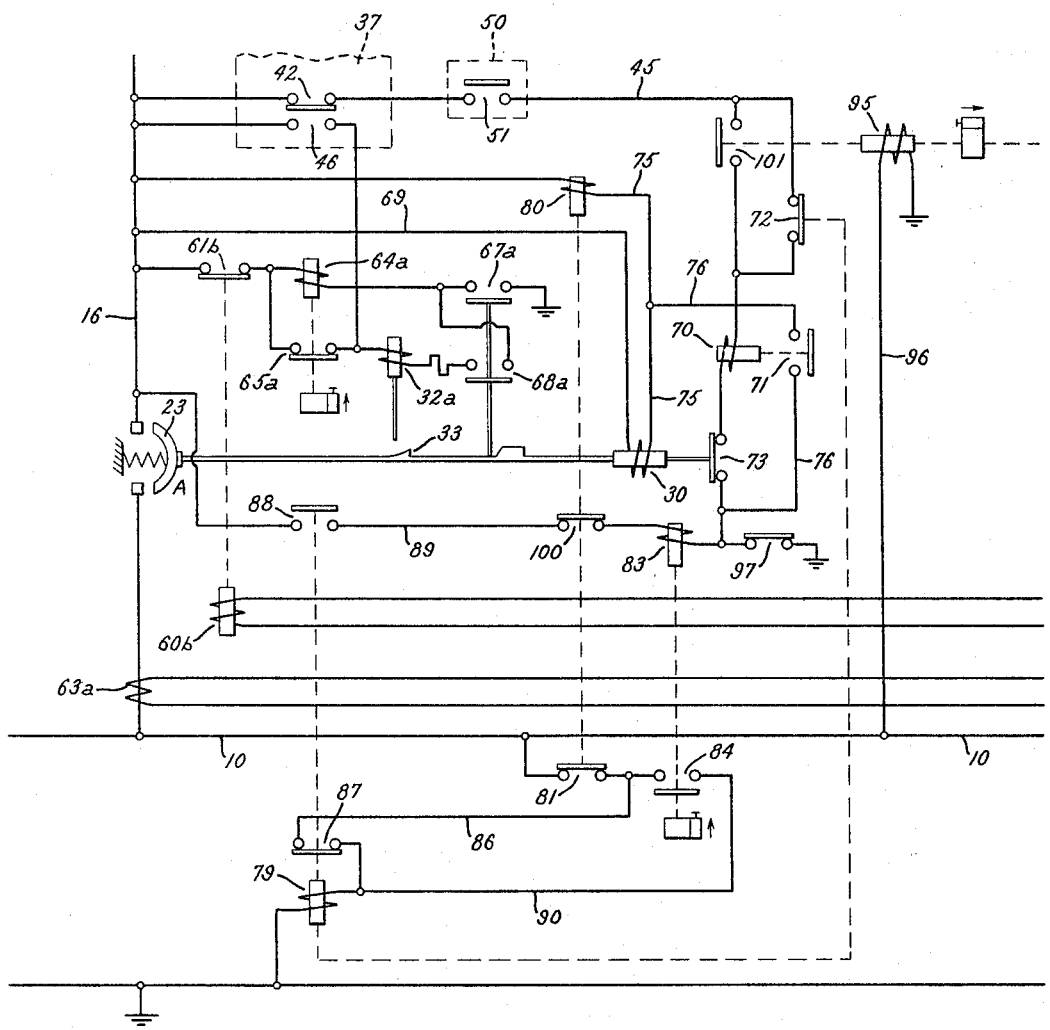

FIG. 2 illustrates a portion of the system of FIG. 1 immediately after a network circuit breaker has opened but prior to the initiation of a reclosing operation.

Referring to the drawing, there is shown an alternating current network 10 which is arranged to be supplied with power from two supply circuits 12 and 14 respectively connected to the network through feeders 16 and 18. In order to simplify the disclosure, single phase circuits are shown, but it will be apparent that the invention is applicable also to polyphase circuits.

Each feeder circuit 16 or 18 includes a step-down power transformer 20, the low voltage secondary winding of which is arranged to be connected to the network 10 by means of a suitable circuit breaker 23, referred to hereinafter as a network circuit breaker. The network circuit breakers in feeders 16 and 18 are designated A and B, respectively. The primary winding of each transformer 20 is arranged to be connected to the supply circuit 12 by means of a suitable circuit breaker 25, referred to hereinafter as a feeder circuit breaker. The transformers 20 and the network circuit breakers 23 are usually located near the network 10, whereas the feeder circuit breakers 25 are usually in a substation or substations containing the supply circuit 12 or 14.

The feeder circuit breakers 25 may be of any suitable conventional type and are preferably arranged so that they are opened automatically in response to overload conditions on the respective feeder circuits. As shown, each feeder circuit breaker 25 is an overcurrent-responsive circuit breaker of the well known latched-closed type and is adapted to be opened by releasing a latch 26 either manually or automatically by means of an overcurrent trip device 27 which is shown connected in series relationship with its associated feeder circuit by means of a current transformer 28. Any suitable means, either manual or automatically controlled, may be used for reclosing each feeder circuit breaker 25.

The network circuit breakers 23 may also be of any suitable type. As shown, each network circuit breaker is of the latch-closed type and includes a closing coil 30, which, when energized, closes the circuit breaker and a trip coil 32, which, when energized, releases a latch 33 that is arranged to hold the circuit breaker in its closed position. Upon latch release, a spring 34 opens the network circuit breaker 23.

Each network circuit breaker 23 has its own control apparatus associated therewith. For the most part, these two controls are identical and corresponding parts have been assigned corresponding reference numerals.

In order to effect the opening of a network circuit breaker 23 when a fault occurs in the associated transformer 20 or in feeder circuit 16 or 18, each network circuit breaker 23 has associated therewith a power directional relay 37 of the wattmetric type. This relay 37 is arranged to effect energization of the trip coil 32 of the associated network circuit breaker 23 when the amount of power flowing from the network to the associated feeder circuit exceeds a predetermined small amount. Since the two power directional relays 37 are identical and are connected in their associated power circuit in the same way, only one, the left hand one, will be described in detail. As shown, this power directional relay 37 includes a potential winding 38 which is permanently connected across the network 10 and a current winding 39 which is permanently connected across the secondary winding 40 of current transformer 41. The primary winding 43 of the current transformer 41 is connected in series relation with the secondary winding of the associated power transformer 20 and the network 10, when the associated network circuit breaker 23 is closed. Each power directional relay 37 is arranged so that normally it maintains closed its contacts 42 which are in a control circuit 45 for the closing coil 30 of the associated network circuit breaker 23. When, however, more than a predetermined amount of reverse power flows from the network 10 to a feeder circuit 16 or 18, the associated power directional relay 37 is arranged to open its contacts 42 and close its contacts 46 which are in the energizing circuit for the trip coil 32 of the associated network circuit breaker 23.

Thus, if a fault should develop on one of the feeders, say from the feeder to ground, there will be a reverse flow of power from the network 10 into the faulted feeder, and this reverse flow of power will cause the power directional relay 37 to trip its associated network circuit breaker 23, thereby isolating the network from the fault.

Each power directional, or master, relay 37 is sufficiently sensitive to respond to transformer exciting currents flowing from the network into the associated power transformer 20 when the associated feeder circuit breaker 25 is open. Thus, when a feeder breaker 25 is opened, even in the absence of a fault, the exciting current flowing from the network into the transformer 20 causes the associated power directional relay 37 to trip the network circuit breaker associated therewith.

In order that each power directional relay 37 may also control the reclosing of the associated network breaker 23 in response to the relative magnitudes of the respective power transformer secondary and network voltages, each current transformer 41 is provided with a tertiary winding 47 which is connected in any suitable manner so that it is energized in accordance with the difference between the respective power transformer secondary voltage and the network voltage when the network circuit breaker 23 is opened. As shown in the drawing, each winding 47 is connected in a shunt circuit around the terminals of the respective network breaker 23. Preferably a suitable current-limiting device, such as resistor 48, is connected in series with each transformer winding 47. With such an arrangement it will be seen that each winding 47, when its respective network breaker 23 is opened, causes a current to flow through the current winding 40 of the respective power directional relay 37 which varies in accordance with the relative magnitudes of the respective power transformer secondary and network voltages. This current through winding 40 is in a proper direction to effect closing of the contacts 42 only when the secondary voltage of the associated power transformer 20 exceeds the network voltage.

For allowing reclosing of a network circuit breaker 23 only when the transformer secondary voltage leads the network voltage, a second network relay 50, referred to as a phasing relay, is provided for each network breaker. Since this relay 50 can be of a conventional design, such as disclosed in U.S. Patent 1,971,810—Blake, assigned to the assignee of the present invention, it is shown in block form only. This relay 50 closes its contacts 51 when the transformer secondary voltage leads the network voltage. Only when these contacts 51 are closed can an associated open network breaker 23 be operated to closed position. Since the contacts 42 of the master relay and the contacts 51 of the phasing relay are in series, the closing control circuit 45 for the network breaker can be closed only when the transformer secondary voltage exceeds the network voltage by a predetermined small amount and leads it in phase position. When these conditions prevail, closing of the associated network breaker will ordinarily result in power flowing from the feeder into the network 10, thus assuring that the power directional relay 37 will not immediately open its network breaker 23 in response to reverse power flow.

This invention is especially applicable to a system in which the feeders have loads other than a network 10 connected to them at various points. Such loads are depicted at 55 connected to the feeder 16 between feeder 16 and ground. Similar loads 56 on feeder 18 are shown connected between feeder 18 and ground.

In most prior network distribution systems, there have been no such independent loads connected to the feeders. The presence of these loads can give rise to a number of problems. One is that voltage and phase angle differences may develop which result in a large reactive circulating current flowing from the network into one feeder. This reactive circulating current can result in overheating problems that prior systems have not provided for. For example, if only reactive circulating current is flowing out of the network into feeder 18, only reactive power of vars will be flowing from the network 10 into the feeder 18. The power directional relay 50 of the network breaker B associated with the feeder 18 will normally not operate in response to vars flowing therethrough, and thus it will be ineffective to open its network breaker 23 in response to this condition. While this condition does result in wattmetric power flow into the network through the other feeder 16, the power directional relay 50 associated with this other feeder 16 will not respond because the direction of power flow is into the network, and the power directional relay 37 is insensitive to power flow in this direction.

*Response to reactive circulating currents*

If the above-described reactive circulating current is high at a time when the network 10 is heavily loaded, the power transformer in feeder 16 may become overheated and damaged by the high resulting currents flowing therethrough. To protect against such damage, an overload relay 60a (FIG. 1b) is associated with feeder 16. The relay 60a is an overcurrent-sensitive relay that will operate in response to excess current flowing through the power transformer 20 of feeder 16. A typical setting for this relay is 175 percent of rated current. When the current through the power transformer 20 secondary winding exceeds this value, relay 60a picks up, closing its contacts 61a to initiate a tripping operation for the network circuit breaker B. When network circuit breaker B opens in response to pickup of relay 60a, as will soon be described, the feeder 18 is disconnected from the network 10, and the flow of reactive circulating current from the network is thus terminated. This correspondingly reduces the current flowing through the power transformer 20 and feeder 16, thus preventing transformer overheating. The overload relay 60a is shown connected across the secondary of a current transformer 63a connected in series with the secondary winding of power transformer 20 in the feeder 16. Thus, the relay 60a is energized by a current substantially proportional to the current flowing through the secondary of power transformer 20 in feeder 16. Referring to FIG. 1b, when overload relay 60a picks up in response to an overcurrent, it closes its contacts 61a and thus completes an energizing circuit for a time delay relay 64b. After this time delay relay 64b has been energized for a predetermined period, e.g., two seconds, it closes its contacts 65b, thereby completing an energizing circuit for trip coil 32 of network breaker B, thus producing tripping of network breaker B. The above energizing circuit for time delay relay 64b extends from feeder 18 through contacts 61a, the coil of relay 64b, conductor 66, and an "a" switch 67 on the network breaker B to ground. The above energizing circuit for trip coil 32 extends from feeder 18 through contacts 61a, contacts 65b, trip coil 32, "a" switches 68 and 67 to ground.

An overload relay 60b corresponding to overload relay 60a is associated with the other feeder 18, and this relay 60b acts in a corresponding manner to effect tripping of the network circuit breaker A should a predetermined overcurrent flow through the secondary of transformer 20 in feeder 18. Corresponding reference numerals except with different suffixes "a" or "b" have been used to designate corresponding parts associated with relays 60a and 60b.

It is to be understood, of course, that should the flow of excess circulating current terminate before the time-delay overload-responsive relay 64a or 64b picks up, no tripping of the associated network breaker will occur. This is desirable since the power transformers will not be overheated by the effects of such short duration circulating currents. Thus, operations of the network circuit breakers that are not needed to protect the transformers are avoided.

Another reason why the above time delay in tripping of the network breakers is desirable is that it minimizes the chances for an incorrect opening of a network circuit breaker in response to a fault on the network. If there is a fault on the network, it is desirable in order to maintain continuous service on the network that the fault be removed by a fuse (not shown) in the network rather than by a network breaker. The above-described time delay in the operation of overload relays 60a and 60b allows time for such fuse operation, thus minimizing the chances that the overload relays 60a or 60b will open a network breaker in response to such a fault.

First reclosing operation

Assume now that the various devices are in a position shown in FIGS. 1a–1b, i.e., with both feeders 16 and 18 energized and power being supplied to the network 10 through the two network breakers A and B. Assume next that conditions should arise in which the loads 55 on the left-hand feeder 16 draw vars from the network 10 in an amount sufficient to cause overload relay 60b to trip network breaker A as above described. Immediately after breaker A opens, its parts will be in the position shown in FIG. 2. After network breaker A opens once, it is immediately reclosed, assuming the power directional relay and the phasing relay have determined after the network breaker opens that conditions are such that wattmetric power will flow into the network upon reclosure. If such conditions are present, the power directional relay 37 and the phasing relay 50 will immediately close their contacts 42 and 51, respectively, following opening of network breaker A. This will complete a closure-initiating circuit 45 through a closing relay 70. Closing relay 70 responds by picking up to close its contacts 71. This completes an energizing circuit 69, 30, 75, 76, 71, 97 for closing coil 30, which responds by closing the network circuit breaker A.

As seen in FIG. 2, the above closure-initiating circuit 45 will extend from feeder 16 through contacts 42 and 51, a set of then-closed contacts 72 on an auxiliary reclosing relay 79, the coil of closing relay 70, a set of b contacts 73 on the network circuit breaker A, through switch 97 to ground. Switch 97 is a manually-operable safety switch that can be opened when desired to prevent an automatic reclosing.

Second reclosing operation

If the reactive circulating current condition that had initiated tripping of network circuit breaker A still prevails upon reclosing, the network breaker A will again open, and this will be followed by a delayed reclosing. In one specific embodiment of the invention, I delay this second reclosure for about thirty minutes after the second opening operation.

This delayed second reclosing is achieved as follows. The first reclosing operation caused a cut-off relay 80 to be operated inasmuch as the coil of cut-off relay 80 is in parallel with the network circuit breaker A's closing coil 30. Operation of this cut-off relay in response to the first reclosing of network breaker A causes the auxiliary reclosing relay 79 to drop out and remain dropped out. When auxiliary reclosing relay 79 is in this dropped-out condition, its contacts 72 are open, and therefore the reclosure-initiating circuit 45 cannot be completed through contacts 72. Reclosure of network breaker A under these conditions is delayed until the timing relay 83 has had an opportunity to pick up. When this timing relay 83 picks up, it closes its contacts 84 to complete an energizing circuit for the then-deenergized auxiliary reclosing relay 79. Auxiliary reclosing relay 79 responds by immediately picking up to close its contacts 72 and initiate a second reclosure of the network breaker A.

For effecting the above-described dropout of auxiliary reclosing relay 79 in response to the first reclosing operation of the associated network breaker, the cutoff relay 80 is provided with a set of contacts 81 in series with the coil of auxiliary reclosing relay 79. This coil of relay 79 is connected between one of the network buses and ground by a circuit 86 that extends through contacts 81, hold-out contacts 87 on the reclosing relay 79 and the coil of reclosing relay 79. When the cut-off relay 80 opens the circuit 86, auxiliary reclosing relay 79 drops out and is maintained dropped-out by hold-out contacts 87. If the network breaker A immediately reopens following a first reclosing, the auxiliary reclosing relay 79 is then in its dropped-out condition with its contacts 88 closed. When these contacts 88 are closed, an energizing circuit 89 is set up to energize the timing relay 83. This energizing circuit 89 is completed by contacts 100 on the cut-off relay 80 when cut-off relay drops out at the end of a reclosing operation of associated network breaker, thus causing timing relay 83 to pick up after a predetermined long period, closing its contacts 84 to pick up auxiliary reclosing relay 79, thereby initiating another reclosing. The energizing circuit for effecting this pick-up of auxiliary reclosing relay 79 is designated 90 and extends through contacts 81 and 84.

If the network circuit breaker A has been quickly reclosed one time and thereafter remains closed for a predetermined long period, e.g., 30 minutes, then the control apparatus will reset to its normal condition of FIG. 1. Such resetting is effected by timing relay 83 closing its contacts 84 at the end of this period to complete pick-up circuit 90 for the auxiliary reclosing relay 79, which then opens its contacts 88 and drops out the timing relay 83. After such resetting, the next opening operation of breaker A will be followed by a quick reclosing. But if an opening operation of breaker A occurs before expiration of this 30 minute resetting period, it will be followed by the delayed second reclosing described hereinabove.

*Quick reclosing of network breaker A should breaker B open during the long timing period normally preceding A's second reclosure*

Assume now that the network breaker A is open and is waiting for timing relay 83 to complete the long duration timing operation that allows network breaker A to close. Assume further that during this timing interval, power is being fed into the network 10 through the other feeder 18. Now let it be assumed that for some reason the network breaker B is opened to deenergize the network 10. Under these conditions, as will soon be explained, the network breaker A will close after a few seconds without waiting for expiration of the timing interval. This quick reclosing is accomplished by relying upon a voltage-responsive monitoring relay 95. The coil of this monitoring relay 95 is connected in a circuit 96 extending between one bus of the network and ground so that it is normally energized by network voltage. Should the network become deenergized, the coil of monitoring relay 95 will also be deenergized. After a predetermined time delay, preferably about two seconds, monitoring relay 95 will drop out, closing a set of contacts 101 in the control circuit for network breaker A and a set of contacts 102 in the closing control circuit for the network breaker B. The closing of contacts 101 will initiate an immediate reclosure of the network circuit protector A. More specifically, the closing of contacts 101 completes an energizing circuit for closing relay 70, causing 70 to close its contacts 71, thereby completing energizing circuit 69, 30, 75, 76, 71, 97 for the closing coil 30 of network breaker A.

The chances are good that the network breaker A will remain closed after such a reclosing since the other feeder 18 is then disconnected from the network. This being the case, the feeder 18 is no longer drawing any vars from the network 10, and this condition is no longer present to cause overload relay 60a to trip network breaker A.

*General discussion*

In the above description, reclosing operations of a network circuit breaker 23 have been described following opening of the network breaker in response to reactive circulating current. It is to be understood, however, that the reclosing operations will be performed in essentially the same manner whether tripping had occured in response to circulating reactive current or in response to operation of the power directional relay 37.

It is to be noted that the tripping of the network circuit breaker A in response to a reactive circulating current condition does not result in any interruption of service to the loads 55 connected to the feeder 16. The feeder circuit breaker 25 in feeder 16 remains closed during this entire period, thus permitting the loads 55 to be supplied from supply circuit 12.

By making the first reclosure of the network breaker A or B a high speed reclosure, we are able to maintain a high degree of continuity of service on the network. In this connection, in certain applications, particularly where the feeders are overhead lines, most faults occurring on a feeder are temporary faults which will disappear immediately upon opening of the associated feeder breaker and network breaker. The feeder breaker can be immediately reclosed to reenergize the feeder and restore service to the loads connected to the feeder. By immediately reclosing the associated network circuit breaker, the connection between the feeder and the network is immediately restored, enabling the network to continue to receive power from the feeder with a minimum of interruption.

Even when a network circuit breaker is opened in response to a reactive circulating current condition, a quick first reclosure is advantageous because in some cases automatic voltage regulators (not shown) on the feeders will then have had an opportunity to adjust the feeder voltage to a value that would prevent further flow of reactive circulating current upon reclosure of the network circuit breaker. Thus, with a first quick reclosing, the feeder would be disconnected from the network for only a very short period.

Assuming that the network circuit breaker immediately reopens after its initial reclosing, the next reclosing operation will be delayed for a relatively long time, e.g., 30 minutes, as was described above. This long delay is introduced primarily to prevent a pumping condition from resulting when conditions are such that a sustained flow of vars from the network into one of the feeders would occur upon reclosing. Assuming the continuance of such a condition, a quick second reclosing of the network breaker would be followed by an immediate reopening and this would be repeated over and over again, possibly damaging the network breaker. This is the pumping condition that we seek to avoid. By delaying the second reclosing, we eliminate the closely repetitive operations that would have followed it had it been a quick reclosing. We are able to thus minimize pumping without losing service to the network, since, as pointed out hereinabove, the network is being fed during this interval by the other feeder through its closed network circuit breaker.

In the above description, a specific explanation has been given of how the network circuit breaker A will operate after it has been called upon to open. It is to be understood that the network circuit breaker B will operate in a corresponding manner after it has been called upon to open since its controls correspond to the controls for network circuit breaker A.

While we have shown and described a particular embodiment of our invention, it will be obvious to those skilled in the art that various changes and modifications may be made without departing from our invention in its broader aspects, and we, therefore, intend in the appended claims to cover all such changes and modifications as fall within the true spirit and scope of the invention.

What we claim as new and desire to secure by Letters Patent of the United States is:

1. In a system of electric distribution that comprises an alternating current network, a pair of feeders for respectively supplying power to the network, and loads other than said network respectively connected to said feeders for receiving power supplied thereto through said feeders, the combination of:
   (a) a first network circuit breaker for connecting one of said feeders to said network,
   (b) a second network circuit breaker for connecting the other of said feeders to said network,
   (c) control apparatus associated with each network circuit breaker for causing opening of the associated network circuit breaker when the direction of power flow is from said network into the associated feeder, and
   (d) means responsive to overcurrent flowing through said first network circuit breaker into said network for causing said second network circuit breaker to open in response to said overcurrent exceeding a predetermined value.

2. The combination of claim 1 in combination with means for maintaining said first network circuit breaker closed while said second network circuit breaker is open to allow the continued flow of power through said first feeder into said network when said second network circuit breaker opens in response to overcurrent.

3. The combination of claim 2 in further combination with
   (a) means for reclosing said second network circuit breaker within a relatively short period following opening thereof, and
   (b) means for reclosing said second network circuit breaker a second time should it open soon after said first reclosing, and (c) means for delaying said second reclosing for a relatively long period compared with said relatively short period.

4. The apparatus of claim 3 in combination with means for reclosing said second network circuit breaker before the expiration of said long time delay period should said network become deenergized during said long time delay period.

5. The combination of claim 1 in further combination with means responsive to overcurrent flowing through said second network circuit breaker into said network for causing said first network circuit breaker to open in response to said overcurrent exceeding a predetermined value.

References Cited
UNITED STATES PATENTS

| | | | |
|---|---|---|---|
| 1,669,149 | 5/1928 | Traver | 317—39 |
| 1,971,810 | 8/1934 | Blake | 317—23 |
| 1,975,172 | 10/1934 | Parsons | 317—43 X |
| 2,233,362 | 2/1941 | Beeman | 307—112 |
| 3,295,019 | 12/1966 | Altfather | 317—39 X |

MILTON O. HIRSHFIELD, *Primary Examiner.*

J. D. TRAMMELL, *Assistant Examiner.*